Figure 1:
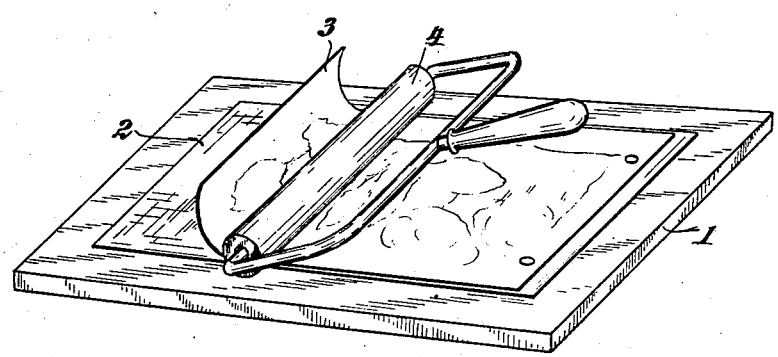

Jan. 28, 1936.                F. LEJEUNE                  2,029,077
   PROCESS FOR THE PRODUCTION OF COLORED PHOTOGRAPHS, PARTICULARLY
        IN NATURAL COLORS, ON PAPERS, FILMS AND THE LIKE
                     Filed April 29, 1931

Dr. F. Lejeune
INVENTOR

Patented Jan. 28, 1936

2,029,077

UNITED STATES PATENT OFFICE 2,029,077

PROCESS FOR THE PRODUCTION OF COLORED PHOTOGRAPHS, PARTICULARLY IN NATURAL COLORS, ON PAPERS, FILMS, AND THE LIKE

Franz Lejeune, Vienna, Austria

Application April 29, 1931, Serial No. 533,841
In Austria May 3, 1930

2 Claims. (Cl. 101—149)

In the process, generally known as "imbibition process" for the production of colored photographs, particularly in natural colors, use is made of colloidal layers prepared for tanning by exposure and in which is embodied the image either in the form of differently hardened places (chromate gelatine copies) or of places of different thickness (layers in relief). These layers are dyed with suitable dyes and in the moist condition are placed into contact with gelatine layers which are supplied with the dyes in accordance with the different hardening or thickness of the layers of the individual places of the image. In the majority of the known processes, the dye is absorbed slowly by the colloidal layer and passes slowly to the final layer of image, so that the production of the three partial prints of three-color photographs takes up some considerable time. The costs of the dyes are comparatively high and therefore have to be used sparingly. Thus it is not possible to suit the dyeing capacity of individual images by tempering the dyes, because a considerable part of the coloring solution is rendered useless for further use.

As already mentioned, organic dyes voluntarily pass from one colloidal layer into another colloidal layer in a comparatively slow manner only and therefore find time to spread laterally, so that the sharpness of the prints is impaired.

Many metallic salts are taken in by colloidal layers and again given up to other colloidal layers far quicker than organic dyes. A large number of metallic salts with chemical reagents yield precipitates of bright colors of a dyeing capacity far superior to that of organic dyes, and therefore only very small quantities of metallic salts are often necessary to produce powerful colorings. Metallic salts with a neutrality with respect to colloids, such as gelatine and the like, are taken in and again given up by the same in accordance with the tempering or hardening. Further in the case of reliefs it is clear, that thicker places of the layer take in and give up a greater quantity of the metallic salt solution than thinner layers.

It is already known to imbibe with metallic salts pigment images on glass, celluloid or the like and after rinsing to wash the same in solutions causing precipitation. Rinsing is necessary for the removal of the adhering solution which otherwise would spoil the reaction of the bath and may produce detrimental films or membranes of precipitation. The present invention is based on the character of the colloidal layers to quickly take in metallic salt solutions until an equilibrium is attained and to quickly give up the same in a quite certain manner to other colloidal layers, in order to produce metallic salt imbibitions in a quite certain shaded saturation, which is produced either by the use of colloidal layers prepared for tanning by exposure or of colloidal layers in relief in combination with colloidal layers squilgeed onto the same. Thereby the precipitation can be produced in the colloidal layer prepared for tanning by exposure or in the colloidal layer in relief or in the layer placed in contact with such image layers. Compared with the known art, the essential feature of the invention consists in that in each case the layer yielding the image contacts with another layer.

Chromatic gelatine layers can be hardened to such an extent by suitable exposure, that they practically do not take in or give up any metallic salt solution at the well exposed places. These layers are suited for the transmission by contact of the metallic salts to the squilgeed gelatine layers. Still better suited are gelatine reliefs such as are obtained for instance in a manner analogous to the pigment process or by tanning the gelatine over silver-precipitations and hot washing of the untanned places. The same are not hardened too much in order that they may still take in a suitable quantity of metallic salts. Therefore, by soaking in a metallic salt solution and effecting precipitation in the layer, the same may be directly converted into color images in which the tone-graduations are produced by the different thicknesses of the uniformly dyed layers.

However in view of the quick absorption and deliverance of metallic salts by the gelatine relief layers it is possible to squeeze the metallic salts out of the relief, the latter being immediately absorbed by the soft gelatine of the reprinting paper or film, so that practically instantaneously is produced an image showing all tone-graduations and the power of which mainly depends on the concentration of the metallic salt solution, so that uniform prints can be quickly produced.

One mode of producing a three-color image is hereinafter described by way of example.

Pigment paper, particularly as is usually sold in shops and the color of which is not of great importance and which is coated with soft gelatine, is bathed in a bichromate solution, squilgeed without the formation of bubbles onto thin cellulose films and dried in the dark, whereby the latter are suitably stretched. Hereafter the part-negatives are copied on the celluloid foil which calls for an exposure corresponding substantially to the copying up to one half of the power necessary on a common celloidine paper. Now the films are soaked and subsequently developed in hot water in known manner, the paper-surface being pulled off after the solution of the unexposed pigment-gelatine and the latter is again rinsed until a harmonic relief is produced, which is clear in the highest lights and positively adheres to the celluloid foil. After drying, the three part-images are soaked in metallic salt solutions, for instance the blue print part-image in a solution of potassium ferrocyanide or potassium ferricyanide, the red print part-image in a solution of nickel sulphate, nickel chloride, nickel oxide ammonia or a like salt of nickel, the yellow print part-image in a solution of bichromate.

A paper preferably coated with gelatine is thoroughly soaked and subsequently freed of any adhering water by means of filter paper or the like. Also from the blue print film are removed the drops of the solution of potassium ferrocyanide or ferricyanide, which preferably is carried out by squilgeeing in contact with a gelatine paper also soaked in the solution of potassium ferrocyanide or ferricyanide, and the said blue print film is squilgeed onto the transmission paper. Gelatine layers, which are squeezed together without a sheet of water interposed between them, quickly adhere so strongly that they cannot be separated and also enclose air-bubbles between them. This is not the case according to the present invention. The length of contact is of no importance. Film and transmission paper can be separated after about thirty seconds. Now the latter is treated with a suitable solution of iron salt (green vitriol), whereby a blue image (Prussian blue or Turnbull's blue) is produced, which is washed for a short time (preferably by adding a few drops of hydrochloric acid) and freed from the adhering water. Now the yellow print image, freed from the adhering bichromate solution in the described manner, is placed in exact superposition on the blue image and squilgeed onto the same, and subsequently the yellow part-image is developed by treating it with a solution of salt of lead (for instance lead nitrate). Now the red print is produced in a similar manner and developed by treating the imbibition of salt of nickel with an aqueous alcoholic solution of dimethyl-dioxine (dimethyl-glyoxime).

If desired the reducing agent preferably in water-insoluble condition may be embodied already in the image surface. For instance the gelatine layer of the image base may contain a precipitate of lead carbonate, lead hydrocarbonate or a like white precipitate which, directly by the absorption of the bichromate from the image surface, yields a yellow image of yellow chromate of lead. In the case of the red part-image, dimethyl-dioxine may be embodied in the gelatine layer of the image base already during the casting. By treating the image layer with a solution of ferric chloride it is possible to embody in said layer also this reducing agent for the blue part-image already before the contact with the print-film.

It is also possible to successively squilgee the part-images without intermediate development and to develope the image in a mixture of the developer. The printing may be carried out not on paper but on films or glass plates coated with gelatine, whereby in case of suitable concentration color diapositives are produced, which show absolutely clear colors, because the precipitations effected in the gelatine are very finely distributed.

For printing, also the reliefs may be used, which are produced in known manner by the tanning development of halogen silver layers or by chrome gelatine layers exposed below diapositives (similar to the pinatype process).

Also single colored or double tone images in different colors may be produced by the use of suitable reactions of metallic salts, for instance yellow images by the production of cadmium sulphide, reddish images by copper cyanide, brown up to black images by causing the various known black precipitations for instance with silver nitrate and subsequent reduction of the same. Also mixtures of metallic salts and reagents may be used.

Figure 2:
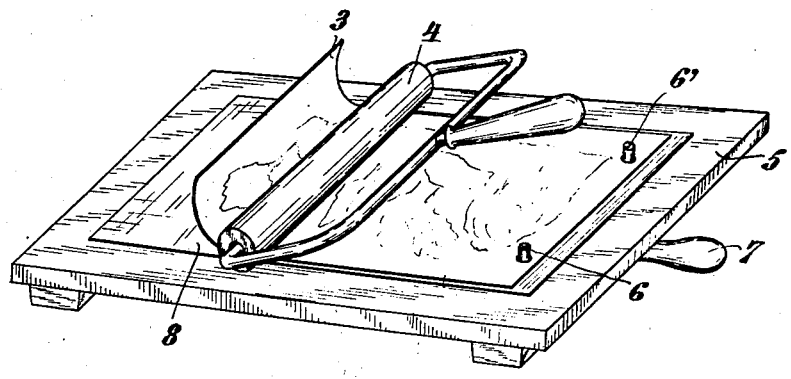

One mode of carrying out the present is illustrated by way of example on the accompanying sheet of drawing in which Figs. 1 and 2 show two steps of the process.

In Fig. 1 designate the characters 1 a glass plate, 2 a sheet of gelatine paper soaked in a metallic salt solution, 3 a film carrying the image in the form of a gelatine relief on the side facing the sheet 2, and 4 is a squilgee for squilgeeing the film 3 onto the sheet 2, so that the gelatine relief absorbs the metallic salt contained in the sheet 2.

Fig. 2 shows a plate 5 provided with two pins 6, 6', which can be depressed by means of a lever 7. A sheet of paper 8 coated with gelatine, on which the final color image is to be produced, is secured to the pins and now the film 3, treated in the manner described with reference to Fig. 1, is secured to the pins 6, 6' and pressed down by means of the squilgee 4. The sheets are released by depressing the pins by means of the lever 7 and are now separated. Subsequently the sheet 8 is placed into a suitable reducing bath in order to develope the image. Hereafter the sheet 8 is placed successively in contact (in the manner hereinbefore described) with the films corresponding to the three part-images and which have been treated with the suitable metallic salt solutions, and the images are successively produced in the same layer.

I claim:—

1. Process for the production of colored photographs in natural colors on a printing surface whereby a colloid printing image produced by tanning in a picture-like manner is soaked with a metallic salt solution yielding color-precipitates if treated with reagents, which consists in placing the layer carrying the image on a second colloid layer soaked with the same metallic salt solution, placing the layers on top of each other with their colloid films facing one another, squilgeeing the layers in intimate contact with each other to force out of the layer carrying the image the adhering metallic salt solution which has not been soaked into the layer last mentioned and produce an equilibrium of the concentration of the metallic salt solution in the first layer in a proper image-like distribution, separating the layers, placing the layer carrying the image in intimate contact with the printing surface, separating the layer carrying the image from the printing surface, and producing the precipitate in the printing surface.

2. Process for the production of colored photographs in natural colors on a single printing surface in which three printing images produced by tanning in a picture-like manner and corresponding to a blue print image, a yellow print image and a red print image are soaked with metallic solutions in a well balanced manner of concentration in a proper image-like distribution, which consists in embodying in the printing surface a precipitate in the form of a water-insoluble lead compound, a precipitate in the form of dimethylglyoxime and a precipitate in the form of ferric salt, hereafter soaking the blue print image with a potassium ferrocyanide solution, placing said blue print image in intimate contact with the printing surface to form a Prussian-blue precipitate therein, stripping off said blue print image, further soaking the yellow print image with a chromatic salt solution, placing said yellow print image in register and intimate contact with the printing surface carrying the blue image to form a yellow precipitate therein, stripping off said yellow print image, soaking the red print image with a nickel-salt solution, placing said red print image in register and intimate contact with the printing surface provided with the blue image and the yellow image to form a red precipitate therein, and stripping of said red print image.

FRANZ LEJEUNE.